United States Patent
Hershman et al.

(10) Patent No.: US 11,636,907 B2
(45) Date of Patent: Apr. 25, 2023

(54) INTEGRITY VERIFICATION OF LIFECYCLE-STATE MEMORY USING MULTI-THRESHOLD SUPPLY VOLTAGE DETECTION

(71) Applicant: NUVOTON TECHNOLOGY CORPORATION, Hsin-chu (TW)

(72) Inventors: Ziv Hershman, Givat Shmuel (IL); Yoel Hayon, Givatayim (IL); Moshe Alon, Tel-Aviv (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 465 days.

(21) Appl. No.: 16/916,142

(22) Filed: Jun. 30, 2020

(65) Prior Publication Data

US 2021/0407610 A1 Dec. 30, 2021

(51) Int. Cl.
*G11C 29/12* (2006.01)
*G11C 29/02* (2006.01)
*G11C 29/44* (2006.01)
*G11C 29/38* (2006.01)
*G11C 29/50* (2006.01)
*G06F 21/57* (2013.01)
*G11C 5/14* (2006.01)
*G06F 30/34* (2020.01)
(Continued)

(52) U.S. Cl.
CPC ........ *G11C 29/12005* (2013.01); *G06F 21/57* (2013.01); *G11C 5/143* (2013.01); *G11C 29/021* (2013.01); *G11C 29/028* (2013.01); *G11C 29/12015* (2013.01); *G11C 29/38* (2013.01); *G11C 29/44* (2013.01); *G11C 29/50004* (2013.01); *G06F 1/025* (2013.01); *G06F 3/062* (2013.01); *G06F 21/78* (2013.01); *G06F 30/34* (2020.01); *G11C 2029/0407* (2013.01)

(58) Field of Classification Search
CPC .......... G06F 21/62; G06F 21/70; G06F 21/71; G06F 21/57; G06F 21/74; G06F 21/76; G06F 2206/1014; G06F 3/0679; G09C 1/00; G11C 17/18; G11C 8/20; H03K 19/17768
See application file for complete search history.

(56) References Cited

U.S. PATENT DOCUMENTS 7,778,074 B2 8/2010 Ahmed
8,379,861 B2 2/2013 Akselrod et al.
(Continued)

*Primary Examiner* — Seokjin Kim
(74) *Attorney, Agent, or Firm* — Kligler & Associates Patent Attorneys Ltd

(57) ABSTRACT

An Integrated Circuit (IC) includes a non-volatile memory (NVM) and secure power-up circuitry. The NVM is configured to store an operational state of the IC. The secure power-up circuitry is configured to (i) during a power-up sequence of the IC, perform a first readout of the operational state from the NVM while a supply voltage of the IC is within a first voltage range, (ii) if the operational state read from the NVM in the first readout is a state that permits access to a sensitive resource of the IC, verify that the supply voltage is within a second voltage range, more stringent than the first voltage range, and then perform a second readout of the operational state from the NVM, and (iii) initiate a responsive action in response to a discrepancy between the operational states read from the NVM in the first readout and in the second readout.

20 Claims, 1 Drawing Sheet

(51) Int. Cl.
　　　*G06F 1/025*　　　(2006.01)
　　　*G06F 3/06*　　　(2006.01)
　　　*G06F 21/78*　　　(2013.01)
　　　*G11C 29/04*　　　(2006.01)

(56) References Cited

U.S. PATENT DOCUMENTS

| | | |
|---|---|---|
| 9,685,958 B2 | 6/2017 | Bhunia et al. |
| 10,037,438 B2 | 7/2018 | Pedersen |
| 10,095,889 B2 | 10/2018 | Pedersen et al. |
| 2011/0156801 A1 | 6/2011 | Tong et al. |
| 2014/0226426 A1* | 8/2014 | Uvieghara ............. G11C 5/143 365/226 |
| 2015/0155854 A1* | 6/2015 | Hayasaka ................. G06F 1/30 327/143 |
| 2018/0374554 A1* | 12/2018 | McWilliams .......... G11C 16/22 |
| 2019/0026497 A1 | 1/2019 | Pedersen et al. |
| 2019/0065751 A1* | 2/2019 | Srinivas ................ G06F 21/575 |
| 2021/0264992 A1* | 8/2021 | Choi ......................... G06F 1/26 |
| 2021/0350032 A1* | 11/2021 | Dover ................... H04L 9/3263 |

* cited by examiner

INTEGRITY VERIFICATION OF LIFECYCLE-STATE MEMORY USING MULTI-THRESHOLD SUPPLY VOLTAGE DETECTION

FIELD OF THE INVENTION

The present invention relates generally to secure Integrated Circuits (ICs), and particularly to integrity verification for a memory that stores a lifecycle state of an IC.

BACKGROUND OF THE INVENTION

Some Integrated Circuits (ICs) comprise Non-Volatile Memory (NVM), such as One-Time Programmable (OTP) memory, which stores the operational state of the IC. The state stored in such a memory may be used for governing access to security features of the IC.

For example, U.S. Patent Application Publication 2019/0026497 describes an integrated circuit that includes a control circuit and a one-time programmable circuit. The control circuit determines if the one-time programmable circuit is programmed in response to an attempt to access a mode of the integrated circuit after the integrated circuit powers up. The control circuit generates a signal to indicate to a user of the integrated circuit that the mode of the integrated circuit has been previously accessed if the control circuit determines that the one-time programmable circuit has been programmed to indicate a previous access to the mode of the integrated circuit.

As another example, U.S. patent Ser. No. 10/095,889 describes an integrated circuit that includes a control circuit, a one-time programmable circuit, and a security feature. The control circuit determines if the one-time programmable circuit is programmed in response to a request by a user of the integrated circuit to access the security feature. The control circuit generates a signal to indicate to the user of the integrated circuit that the security feature has been previously accessed if the control circuit determines that the one-time programmable circuit has been programmed to indicate a previous access to the security feature. The control circuit causes the one-time programmable circuit to be programmed in response to the request if the control circuit determines that the one-time programmable circuit has not been programmed.

SUMMARY OF THE INVENTION

An embodiment of the present invention that is described herein provides an Integrated Circuit (IC) including a non-volatile memory (NVM) and secure power-up circuitry. The NVM is configured to store an operational state of the IC. The secure power-up circuitry is configured to (i) during a power-up sequence of the IC, perform a first readout of the operational state from the NVM while a supply voltage of the IC is within a first voltage range, (ii) if the operational state read from the NVM in the first readout is a state that permits access to a sensitive resource of the IC, verify that the supply voltage is within a second voltage range, more stringent than the first voltage range, and then perform a second readout of the operational state from the NVM, and (iii) initiate a responsive action in response to a discrepancy between the operational states read from the NVM in the first readout and in the second readout.

In some embodiments, the secure power-up circuitry is configured to verify that the supply voltage is within the first voltage range by verifying that the supply voltage has reached at least a first voltage, and to verify that the supply voltage is within the second voltage range by verifying that the supply voltage has reached at least a second voltage, higher than the first voltage. In an example embodiment, the first voltage is within an operational voltage range of functional circuitry of the IC but below an operational voltage range of the NVM, and the second voltage is within the operational voltage range of the NVM.

In an embodiment, the state that permits access to the sensitive resource is a default state indicative of a newly-produced IC. In another embodiment, the state that permits access to the sensitive resource is a test state. In some embodiments, the NVM includes a One-Time Programmable (OTP) memory.

In yet another embodiment, the secure power-up circuitry is configured to wait at least a predefined time period between the first readout and the second readout. In still another embodiment, the NVM is further configured to store (i) calibration data for a voltage detector of the IC and (ii) an error detection code calculated over the calibration data, and the secure power-up circuitry is configured to read the calibration data and the error detection code during the first readout, and to perform the second readout in response to detection of an error by the error detection code.

In a disclosed embodiment, the secure power-up circuitry is configured to compare the supply voltage to the first and second voltage ranges by modifying at least one tunable threshold in a voltage detector that senses the supply voltage. In an example embodiment, the secure power-up circuitry is configured to compare the supply voltage to the first and second voltage ranges using respective first and second voltage detectors that sense the supply voltage.

There is additionally provided, in accordance with an embodiment of the present invention, a method for securing a power-up sequence of an Integrated Circuit (IC). The method includes, during a power-up sequence of the IC, performing a first readout of an operational state of the IC from a non-volatile memory (NVM) while a supply voltage of the IC is within a first voltage range. If the operational state read from the NVM in the first readout is a state that permits access to a sensitive resource of the IC, a verification is made that the supply voltage is within a second voltage range, more stringent than the first voltage range, and then a second readout of the operational state is performed from the NVM. A responsive action is initiated in response to a discrepancy between the operational states read from the NVM in the first readout and in the second readout.

The present invention will be more fully understood from the following detailed description of the embodiments thereof, taken together with the drawings in which:

DETAILED DESCRIPTION OF EMBODIMENTS

Overview

Figure 1:
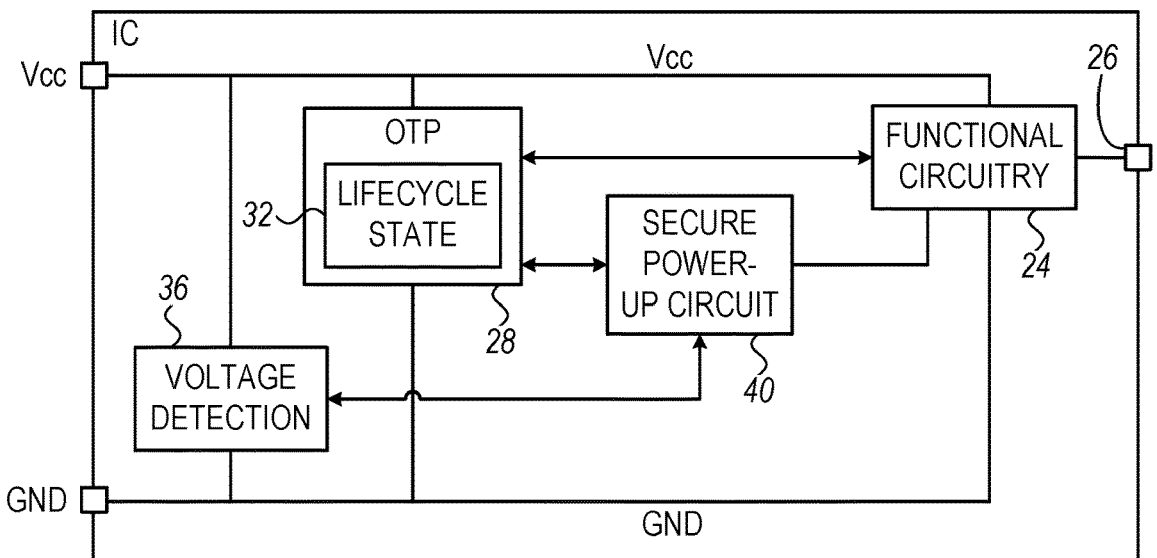
FIG. 1 is a block diagram that schematically illustrates a secure IC, in accordance with an embodiment of the present invention.

Embodiments of the present invention that are described herein provide improved methods and circuitry for securing power-up sequences of Integrated Circuits (ICs). The disclosed techniques can be used in various types of ICs, such as secure controllers and memory devices.

In some embodiments, an IC comprises a Non-Volatile Memory (NVM) that is configured to store the operational state of the IC. The embodiments described herein refer mainly to One-Time Programmable (OTP) memory, but the disclosed techniques can be used with other kinds of NVM, e.g., Flash memory or $E^2PROM$. In the present context, the term "operational state" refers to a state that is indicative of the lifecycle stage of the IC. The terms "operational state" and "lifecycle state" are used interchangeably herein. Non-limiting examples of operational states include DEFAULT (a newly-produced, virgin IC), TEST (an IC open for testing), DEVELOP (an IC under development), OPERATION (an operational IC as provided to users) and RMA (an IC returned to the manufacturer, e.g., due to failure).

In order to enable proper handling of the IC at its different lifecycle stages, different operational states may enable different access privileges to IC resources. For example, in the DEFAULT state the IC is typically assumed not to hold any sensitive information, and this state is therefore relatively permissive in allowing user access to IC resources. The TEST mode is usually also relatively permissive, since testing is usually performed in absence of sensitive information, and requires unrestricted access for proper testing. In the OPERATION state, on the other hand, the IC is assumed to be fully operational in the user's system and to possibly contain sensitive information. As such, the OPERATION state is typically restricted in allowing the user access to IC resources.

In an example implementation, the appropriate access privileges are enabled or disabled during the IC's power-up sequence. In such an implementation, the IC comprises power-up circuitry that performs the power-up sequence of the IC. As part of the power-up sequence, the power-up circuitry reads the IC's operational state from the NVM, and enables or disables access to various resources depending on the read operational state.

A power-up sequence of this sort, however, may be exposed to security attacks. For example, an attacker may attempt to cause the power-up circuitry to mis-read the operational state, in the hope that the power-up circuitry decides on a more permissive operational state than the genuine operational state of the IC. In one possible attack scenario, the attacker may attempt to set an intermediate supply voltage, e.g., by delicate voltage control or by voltage glitch insertion, that the power-up circuitry considers valid, but at which the NVM is not fully stable. At this supply voltage there is some likelihood that the NVM will return erroneous data when read, and that this erroneous data might be interpreted by the power-up circuitry as a permissive operational state.

In some embodiments, the power-up circuitry mitigates the above-described vulnerability by setting a more stringent supply-voltage range, and re-reading the operational state from the NVM. In some embodiments, the power-up circuitry performs a first readout of the operational state from the NVM while the supply voltage of the IC is verified to be within a first voltage range. If the operational state read from the NVM in the first readout is a state that permits access to a sensitive resource of the IC, e.g., DEFAULT or TEST, the power-up circuitry verifies that the supply voltage is within a second voltage range, more stringent than the first voltage range, and then performs a second readout of the operational state from the NVM. If a discrepancy is found between the operational states read in the first readout and in the second readout, the power-up circuitry initiates a suitable responsive action. The second voltage range may be more stringent (narrower) than the first voltage range at its upper end, lower end, or both.

For example, the power-up circuitry may enforce different thresholds on the minimally-required supply voltage for the first readout and for the second readout. In other words, the power-up circuitry verifies that the supply voltage is within the first voltage range by verifying that the supply voltage has reached at least a first voltage. The power-up circuitry verifies that the supply voltage is within the second voltage range by verifying that the supply voltage has reached at least a second voltage, higher than the first voltage.

In some embodiments the first voltage (the voltage threshold set for the first readout from the NVM) is within the operational range of the functional circuitry of the IC, but below the operational voltage range of the NVM. The second voltage (the voltage threshold set for the second readout from the NVM) is within the operational range of the NVM.

Various example implementations and variations of the disclosed techniques are described herein.

System Description

FIG. 1 is a block diagram that schematically illustrates a secure IC 20, in accordance with an embodiment of the present invention. Secure IC 20 may comprise, for example, a secure controller used, inter alia, for performing cryptographic operations, a secure memory used for storing sensitive information, or any other suitable type of IC.

IC 20 comprises functional circuitry 24. The term "functional circuitry" refers to circuitry that is configured to perform the designated functions of IC 20, e.g., various processing and/or data storage operations. In the present example, functional circuitry 24 is accessible via an interface 26. Interface 26 may comprise, for example, a suitable serial or parallel bus that is normally used for communicating between IC 20 and a host or a tester.

IC 20 further comprises an OTP memory 28 (also referred to as simply "OTP" for brevity), which stores a current lifecycle state 32 of IC 20. As noted above, the description below will refer mainly to OTP, by way of example, but the disclosed techniques are applicable to other types of non-volatile memory, as well. OTP 28 may store any other suitable information in addition to lifecycle state 32.

The various components of IC 20, including functional circuitry 24 and OTP 28, are powered by a supply voltage denoted Vcc, referenced to ground—GND.

In some embodiments, IC 20 comprises a secure power-up circuit 40 that carries out a power-up process (also referred to as "power-up sequence") of the IC. In the present context, the term "power-up sequence" refers to the process of initiating operation of the IC when supply voltage Vcc is applied.

In an embodiment, IC 20 comprises a voltage detector 36 that is connected between Vcc and GND and senses the level of the supply voltage Vcc. In the present embodiment, voltage detector 36 is configured to compare Vcc to a threshold, and to output an indication of whether Vcc is above or below the threshold. As will be described below, power-up circuit 40 uses the ability to modify this threshold for securing the power-up sequence. In alternative embodiments, a voltage detector having two separate thresholds, or two separate voltage detectors having different respective thresholds, can be used instead of a single tunable threshold.

The configurations of IC 20 and its elements, as shown in FIG. 1, are example configurations that are depicted purely for the sake of conceptual clarity. In alternative embodiments, any other suitable configurations can be used. In various embodiments, IC 20 and its elements may be implemented using any suitable hardware, such as in an Application-Specific Integrated Circuit (ASIC) or Field-Programmable Gate Array (FPGA).

In some embodiments, some or all of the functions of power-up circuit 40 may be performed by a general-purpose processor, which is programmed in software to carry out the functions described herein. The software may be pre-programmed securely in a Read-Only Memory (ROM) accessible by the processor, or downloaded to the processor in electronic form, over a network, for example, or it may, alternatively or additionally, be provided and/or stored on non-transitory tangible media, such as magnetic, optical, or electronic memory.

Secure Power-Up Sequence Using Stringent OTP Supply-Voltage Range

As explained above, IC 20 may enable different access privileges to its resources at different lifecycle states. Lifecycle states such as DEFAULT and TEST are typically more permissive, whereas the OPERATION state is typically more restrictive in allowing access to IC resources.

In the present context, the term "resource" refers to information stored in memory in IC 20, e.g., in functional circuitry 24 or otherwise, as well as various hardware circuits in IC 20, e.g., in functional circuitry 24 or otherwise, which can be configured or monitored. The term "resource" also refers to functionalities, capabilities or operations to be performed. For example, debugging capabilities may be permitted in some lifecycle states but not in others. In the present example, users access the various resources of the IC via interface 26. Generally, however, access to resources may also be internal to the IC, e.g., by internal hardware or software.

In a typical implementation, power-up circuit 40 reads lifecycle state 32 from OTP 28 during the power-up sequence, and then enables or disables the appropriate access to resources, depending on the read lifecycle state. Any suitable resource of IC 20 can be managed in this manner.

Unless properly secured, the above-described power-up sequence is prone to hostile attacks. Consider, for example, the following real-life implementation:

In the DEFAULT state, OTP 28 is "virgin", i.e., unburned, and therefore readout of lifecycle state 32 will return all-zeros. Other lifecycle states (e.g., OPERATION) are represented by other values (not all-zeros) of lifecycle state 32 stored in OTP 28. Note that the DEFAULT state is not a value that is proactively stored in OTP 28. Rather, the known all-zeros state of an unburned OTP memory is interpreted as a DEFAULT state.

The operational voltage range of OTP 40 is more stringent than the operational voltage range of functional circuitry 24. Specifically, there exists an intermediate voltage Vint that is within the guaranteed operational range of functional circuitry 24, but is outside the guaranteed operational range of OTP 40. In one example use-case, the operational range of OTP 40 is 2.0-3.6V, whereas the operational voltage range of functional circuitry 24 (or at least the parts of the functional circuitry responsible for initialization) is 1.8-3.6V. In this non-limiting example, any voltage between 1.8-2.0V is within the guaranteed operational range of functional circuitry 24 but outside the guaranteed operational range of OTP 40.

Without proper security, when the supply voltage Vcc is set to Vcc=Vint, functional circuitry 24 is operational but OTP 40 may return unpredictable data when read. An attacker may attempt to apply Vcc=Vint to an IC 20 that is in the OPERATION state (or other state that is not DEFAULT and permits access to a sensitive resource). Under this supply voltage, there is some probability that when power-up circuitry 40 reads lifecycle state 32 from OTP 28, the OTP will erroneously return all-zeros instead of the correct value of lifecycle state 32. This erroneous readout would cause power-up circuitry 40 to enable access to resources according to the privileges of the DEFAULT state, even though IC 20 is genuinely in the OPERATION state. The attacker may perform repeated power-up attempts with Vcc=Vint, to increase the likelihood of successful attack.

In some embodiments, power-up circuitry 40 protects IC 20 from this sort of attack by requiring a more stringent voltage range when readout of lifecycle state 32 returns all-zeros.

Figure 2:
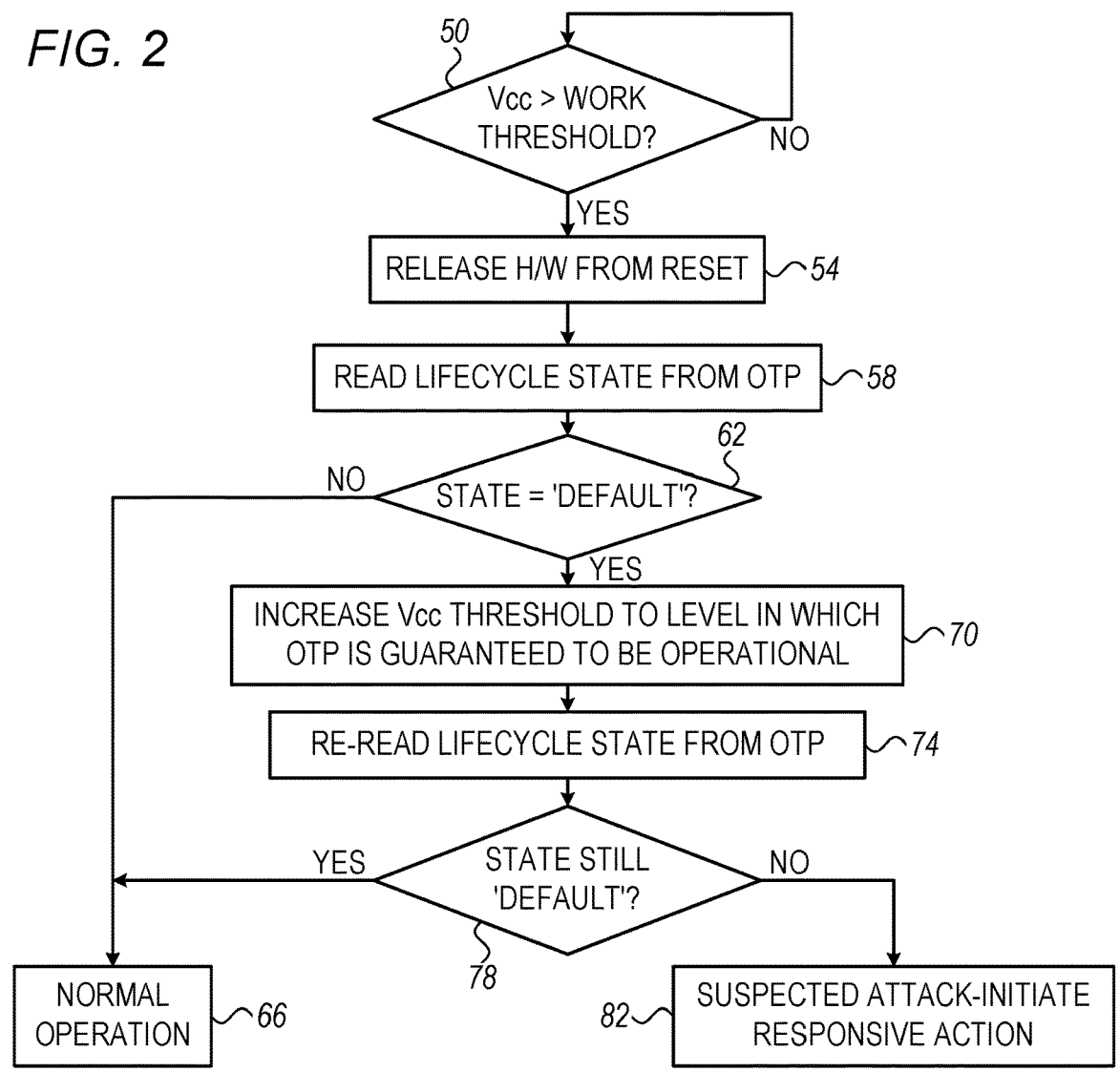
FIG. 2 is a flow chart that schematically illustrates a method for securing a power-up sequence in the IC of FIG. 1, in accordance with an embodiment of the present invention.

FIG. 2 is a flow chart that schematically illustrates a secure power-up sequence, carried out by power-up circuitry 40 in IC 20, in accordance with an embodiment of the present invention. At the beginning of the process, the voltage threshold of voltage detector 36 is initialized to a work threshold denoted V1. V1 is chosen to be within the guaranteed operational voltage range of functional circuitry 24, but might be below the guaranteed operational voltage range of OTP 28.

At a voltage checking step 50, power-up circuitry 40 checks whether Vcc>V1, according to the indication provided by voltage detector 36. Under normal conditions, when power is applied to IC 20, Vcc rises gradually until entering the specified voltage range. As long as Vcc<V1, the method loops back on step 50. When Vcc>V1, power-up circuitry 40 releases functional circuitry 24 from reset, at a releasing step 54.

At a first readout step 58, power-up circuitry 40 reads lifecycle state 32 from OTP 28, possibly following a certain time delay for stabilization. At a state checking step 62, power-up circuitry 40 checks whether the read lifecycle state is the DEFAULT state. If not, power-up circuitry 40 proceeds to complete the power-up sequence and begin normal operation of the IC, at a normal operation step 66.

If, on the other hand, the outcome of step 62 is that the read lifecycle state is the DEFAULT state (i.e., if OTP 28 has returned all-zeros), power-up circuitry increases the voltage threshold of voltage detector 36 to a threshold denoted V2, higher than V1, at a threshold increasing step 70. V2 is chosen to be within the guaranteed operational voltage range of OTP 28.

At a second readout step 74, power-up circuitry 40 re-reads lifecycle state 32 from OTP 28, now under the increased voltage threshold V2. In an embodiment, power-up circuitry 40 may force a wait period, of at least a predefined time duration, between the first readout of step 58 and the second readout of step 74. (If the supply voltage Vcc does not reach V2 at all, the process stalls.)

At a state re-checking step 78, power-up circuitry 40 checks whether the read lifecycle state is still DEFAULT. If so, since the second readout was performed with Vcc within the guaranteed operational range of OTP 28, power-up circuitry 40 concludes that no attack is suspected, and the lifecycle state of IC 20 is indeed DEFAULT. As such, power-up circuitry 40 proceeds to normal operation step 66.

Otherwise, i.e., if the second readout of lifecycle state 32 from OTP 28 does not return DEFAULT (all zeros), power-up circuitry initiates a responsive action. Such a discrepancy between the second readout (performed while OTP 28 is known to be operational and stable) and the first readout (performed at the initial voltage threshold V1) may be indicative of an attack. Power-up circuitry 40 may initiate any suitable responsive action, e.g., issuing an alert, disabling some or all of IC 20, resetting IC 20, erasing some or all data from IC 20, and the like.

It is possible in principle to secure the power-up sequence in other ways. For example, it is possible to define the DEFAULT state as a non-permissive state that does not permit access to any sensitive resources, e.g., allowing it to only transition to the TEST state. As another example, it is possible to use highly accurate voltage detection, which guarantees that the OTP is operational whenever the functional circuitry is operational. Yet another possibility is to power the OTP with a dedicated voltage regulator. All of these solutions, however, are considerably more complex to implement and/or limit operational flexibility, relative to the disclosed technique.

Additional Embodiments and Variations

In some embodiments, OTP 28 is configured to store calibration data of voltage detector 36, along with error detection bits that are calculated over the calibration data. The calibration data typically compensates for variations of voltage detector 36, e.g., over temperature or relative to some "golden standard" detector. The error detection bits may comprise, for example, a Cyclic Redundancy Check (CRC) code, parity bits, a SHA digest, a Hash-based Message Authentication Code (HMAC) with on-chip key or other signature, or any other suitable code. The error detection bits are typically specified to have at least a predefined protection level.

Checking for errors is typically performed by reading the calibration data and the error detection bits from the OTP, recalculating the error detection bits over the calibration data, and comparing the recalculated error detection bits to the error detection bits read from the OTP. An unburned OTP (e.g., in the DEFAULT state) typically does not contain calibration data, and is therefore expected to fail this test.

In some embodiments, power-up circuitry 40 use the presence or absence of calibration data having valid error detection bits as a means for determining whether OTP 28 is in the DEFAULT state or not. For example, at step 62 of FIG. 2, power-up circuitry 40 may attempt to read the calibration data and the error detection bits from OTP 28. If errors are detected, power-up circuitry 40 may conclude that the OTP is in the DEFAULT state, and proceed to step 70.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Circuit (IC), comprising:
a non-volatile memory (NVM) configured to store an operational state of the IC; and
secure power-up circuitry, configured to:
during a power-up sequence of the IC, perform a first readout of the operational state from the NVM while a supply voltage of the IC is within a first voltage range;
when the operational state read from the NVM in the first readout is a state that permits access to a sensitive resource of the IC, verify that the supply voltage is within a second voltage range, more stringent than the first voltage range, and then perform a second readout of the operational state from the NVM; and
initiate a responsive action in response to a discrepancy between the operational states read from the NVM in the first readout and in the second readout.

2. The IC according to claim 1, wherein the secure power-up circuitry is configured to verify that the supply voltage is within the first voltage range by verifying that the supply voltage has reached at least a first voltage, and to verify that the supply voltage is within the second voltage range by verifying that the supply voltage has reached at least a second voltage, higher than the first voltage.

3. The IC according to claim 2, wherein the first voltage is within an operational voltage range of functional circuitry of the IC but below an operational voltage range of the NVM, and wherein the second voltage is within the operational voltage range of the NVM.

4. The IC according to claim 1, wherein the state that permits access to the sensitive resource is a default state indicative of a newly-produced IC.

5. The IC according to claim 1, wherein the state that permits access to the sensitive resource is a test state.

6. The IC according to claim 1, wherein the NVM comprises a One-Time Programmable (OTP) memory.

7. The IC according to claim 1, wherein the secure power-up circuitry is configured to wait at least a predefined time period between the first readout and the second readout.

8. The IC according to claim 1,
wherein the NVM is further configured to store (i) calibration data for a voltage detector of the IC and (ii) an error detection code calculated over the calibration data,
and wherein the secure power-up circuitry is configured to read the calibration data and the error detection code during the first readout, and to perform the second readout in response to detection of an error by the error detection code.

9. The IC according to claim 1, wherein the secure power-up circuitry is configured to compare the supply voltage to the first and second voltage ranges by modifying at least one tunable threshold in a voltage detector that senses the supply voltage.

10. The IC according to claim 1, wherein the secure power-up circuitry is configured to compare the supply voltage to the first and second voltage ranges using respective first and second voltage detectors that sense the supply voltage.

11. A method for securing a power-up sequence of an Integrated Circuit (IC), the method comprising:

during a power-up sequence of the IC, performing a first readout of an operational state of the IC from a non-volatile memory (NVM) while a supply voltage of the IC is within a first voltage range;

when the operational state read from the NVM in the first readout is a state that permits access to a sensitive resource of the IC, verifying that the supply voltage is within a second voltage range, more stringent than the first voltage range, and then performing a second readout of the operational state from the NVM; and initiating a responsive action in response to a discrepancy between the operational states read from the NVM in the first readout and in the second readout.

12. The method according to claim 11, and comprising verifying that the supply voltage is within the first voltage range by verifying that the supply voltage has reached at least a first voltage, wherein verifying that the supply voltage is within the second voltage range comprises verifying that the supply voltage has reached at least a second voltage, higher than the first voltage.

13. The method according to claim 12, wherein the first voltage is within an operational voltage range of functional circuitry of the IC but below an operational voltage range of the NVM, and wherein the second voltage is within the operational voltage range of the NVM.

14. The method according to claim 11, wherein the state that permits access to the sensitive resource is a default state indicative of a newly-produced IC.

15. The method according to claim 11, wherein the state that permits access to the sensitive resource is a test state.

16. The method according to claim 11, wherein the NVM comprises a One-Time Programmable (OTP) memory.

17. The method according to claim 11, and comprising waiting at least a predefined time period between the first readout and the second readout.

18. The method according to claim 11, further comprising reading from the NVM during the first readout (i) calibration data for a voltage detector of the IC and (ii) an error detection code calculated over the calibration data, and performing the second readout in response to detection of an error by the error detection code.

19. The method according to claim 11, and comprising comparing the supply voltage to the first and second voltage ranges by modifying at least one tunable threshold in a voltage detector that senses the supply voltage.

20. The method according to claim 11, and comprising comparing the supply voltage to the first and second voltage ranges using respective first and second voltage detectors that sense the supply voltage.

* * * * *